United States Patent
Paz-Pujalt et al.

(10) Patent No.: US 6,842,534 B1
(45) Date of Patent: Jan. 11, 2005

(54) DETECTING MATERIAL FAILURES IN GROUND LOCATIONS

(75) Inventors: Gustavo R. Paz-Pujalt, Rochester, NY (US); John P. Spoonhower, Webster, NY (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 714 days.

(21) Appl. No.: 09/672,281

(22) Filed: Sep. 28, 2000

(51) Int. Cl.[7] .................................................. G06K 9/00
(52) U.S. Cl. ..................... 382/149; 382/309; 73/146
(58) Field of Search ................................ 382/103, 143, 382/149, 151, 181, 209, 218, 291, 309, 311; 73/146, 865.8; 348/125, 128, 1

(56) References Cited

U.S. PATENT DOCUMENTS

| | | | | |
|---|---|---|---|---|
| 4,124,990 A | * | 11/1978 | Bell et al. ..................... | 405/167 |
| 4,653,316 A | * | 3/1987 | Fukuhara ...................... | 73/146 |
| 4,987,412 A | * | 1/1991 | Vaitekunas et al. ........ | 345/635 |
| 5,026,141 A | * | 6/1991 | Griffiths ....................... | 385/13 |
| 5,042,055 A | * | 8/1991 | Wirt et al. .................... | 378/59 |
| 5,126,654 A | * | 6/1992 | Murphy et al. ............. | 324/71.2 |
| 5,444,241 A | * | 8/1995 | Del Grande et al. ........ | 250/253 |
| 5,656,786 A | * | 8/1997 | Curtis et al. ............... | 73/865.8 |
| 5,657,003 A | * | 8/1997 | Fuentes ....................... | 340/690 |
| 5,686,674 A | * | 11/1997 | Lowry et al. .............. | 73/865.8 |
| 5,817,945 A | | 10/1998 | Morris et al. ................. | 73/800 |
| 6,178,253 B1 | * | 1/2001 | Hendrickson et al. ...... | 382/110 |
| 6,336,095 B1 | * | 1/2002 | Rosen ............................ | 705/1 |
| 6,560,729 B1 | * | 5/2003 | Anuntapong et al. ....... | 714/718 |
| 6,615,648 B1 | * | 9/2003 | Ferguson et al. ............. | 73/146 |

FOREIGN PATENT DOCUMENTS

| | | |
|---|---|---|
| EP | 1248074 | 10/2002 |
| GB | 2194062 | 2/1988 |
| JP | 03-215334 | 9/1991 |
| JP | 07-280735 | 10/1995 |
| WO | 99/32725 | 7/1999 |

OTHER PUBLICATIONS

DeVault "Robotic System for Underwater Inspection of Bridge Piers", IEEE, pp. 32–37, Sep. 2000.*

* cited by examiner

*Primary Examiner*—Daniel Mariam
(74) *Attorney, Agent, or Firm*—RatnerPrestia

(57) ABSTRACT

A method for capturing images of ground locations and for detecting the presence of failure(s) or material failures in man-made structures in such ground locations is disclosed. The method provides an image sensor spaced remotely from the ground and which sequentially captures a number of images of various ground locations to provide digital images; processing captured digital images to determine the presence of a potential material failure in a man-made structure in accordance with predetermined coordinate positions which locate the man-made structures in one or more of the captured digital images; and indicating to a customer that a potential material failure has been detected in a predetermined coordinate position.

12 Claims, 5 Drawing Sheets

US 6,842,534 B1

DETECTING MATERIAL FAILURES IN GROUND LOCATIONS

FIELD OF THE INVENTION

The present invention relates to remotely detecting material failures in a ground location by using an image sensor.

BACKGROUND OF THE INVENTION

The surveillance of ground topography is well known in the art. It is frequently the case that an aircraft or a satellite includes an image capture device such as a CCD. In ground surveillance it is highly desirable to detect whether there has been a material failure in a man-made object such as a road, a pipeline, an electrical grid, or other man-made structures of practical interest. When detected, a determination is made if remedial action must be taken. Often times a visual inspection of ground topography is provided by a land-based crew that traverses a n a rea by vehicle or foot, to determine if there is a material failure. Airborne photographic systems can also be used for capturing images of adjacent areas. These images are then reviewed to determine if there is a material failure.

SUMMARY OF THE INVENTION

It is an object of the present invention to provide an improved way to automatically determine if there is a material failure in a man-made structure.

This object is achieved by a method for capturing images of ground locations and for detecting the presence of material failures in man-made structures in such ground locations comprising the steps of:

(a) providing an image sensor spaced remotely from the ground and which sequentially captures a number of images of various ground locations to provide digital images;

(b) processing captured digital images to determine the presence of a potential material failure in a man-made structure in accordance with predetermined coordinate positions which locate the man-made structures in one or more of the captured digital images; and (c) indicating to a customer that a potential material failure has been detected in a predetermined coordinate position.

In many cases it is required to inspect man-made structures frequently in order to determine the likelihood or development of potential material failures. In many cases these inspections are done by a ground site survey; individuals visit these locations and take measurements or other form of data on-sight. This process becomes cumbersome, costly, inconvenient, and in many cases unreliable and unsafe due to the dangers present in remote locations and to potential false interpretations due to worker fatigue and other factors. Furthermore, remote locations are frequently in mountains, deserts and forests that are difficult to reach and frequent inspection requires the placement of permanent maintenance and inspection crews adding to overall costs. It is an advantage of the present invention to provide a more effective way of determining material failures in man-made structures by automatically processing images captured from a remote platform. This automatic processing can include comparing with previously detected images. This automatic processing can also include algorithms and expert systems that act in a predictive manner.

A feature of the present invention is that a chemical agent or a chemical change associated with a material failure can be used in a man-made structure of practical interest that is particularly suitable for detection after a material failure.

DESCRIPTION OF THE PREFERRED EMBODIMENTS

Figure 1:
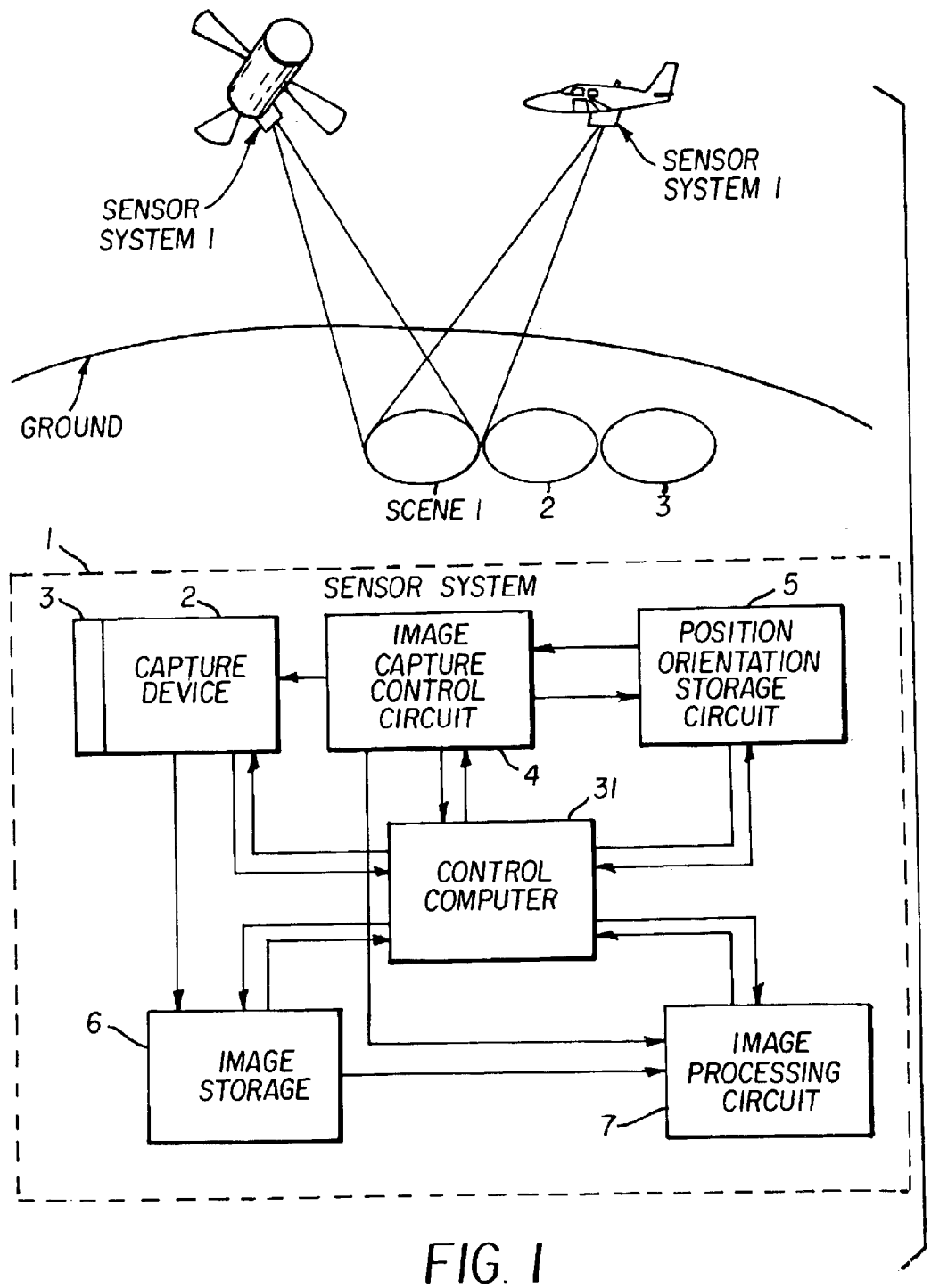
FIG. 1 depicts a system for capturing images from an airborne or a satellite platform in accordance with the present invention.

A sensor system 1 employed in the capturing of images in order to identify material failures in man-made structures may be mounted on either an aerial or a satellite platform. Images of the ground containing various man-made structures such as roadways, pipelines, electrical power lines, agricultural, mining, real estate activity and the like are captured by this sensor system 1. The term "man-made structure" can also include other human activities such as insecticide spraying which after application can be detected by sensor system 1. In such a case, an additive can be included in the insecticide spray that can be detected by the image sensor. Sequential images may be captured in digital form and either stored in the aerial or satellite platform to be transferred later or transmitted via a radio link to a control ground station. The capture device 2 includes an electronic sensor, typically a CCD or CMOS imaging array that along with some imaging optics captures a picture of the scene in electronic form. In some instances a special optical filter 3 is attached to the input to the CCD or CMOS detector to filter the light wavelengths which are incident upon the detector. This optical filter 3 is chosen so as to maximize the signal-to-noise ratio for the detection of a specific type of material failure. Alternatively, the ground location image can be captured by conventional photographic cameras. Film images would then have to be converted to digital images by an image scanner that includes an image sensor. The system 1 also has an image capture control circuit 4 that sequences the operation of the capture device 2. As will be clear from FIG. 1, the operation of the various elements shown in system 1 are under the control of a control computer 31. The image capture control circuit 4 controls capture device 2 and sends position and orientation information to a position and orientation storage circuit 5 with each captured image. Position information in the form of spatial coordinates is provided by the customer in order to identify the location of man-made structures of interest. Such position information is also stored in position and orientation storage circuit 5. Position and orientation data are used along with predetermined coordinate positions to locate the man-made structures in the captured image. Control computer 31 causes image data to be stored in image storage 6 and can be processed to identify features of a scene in image processing circuit 7. The processing sequence is also directed by control computer 31 of the image data in this instance is to enhance the capability of the system 1 to identify material failures in man-made structures. The image processing circuit 7 includes a storage memory (not shown) that includes a representation of different material failures to be detected and comparing the captured digital image with the material failures to determine the presence of a material failure, type of material failures and location of the material failures. With the exception of the capture device 2, the various elements of the system 1 may be located either in the remote platform or at the ground station location. Moreover, many of the elements described can be embodied in software which can be understood to be within the control computer 31. The capture device 2 is located in either the aerial or satellite platform or a fixed structure spaced above the ground.

Figure 2:
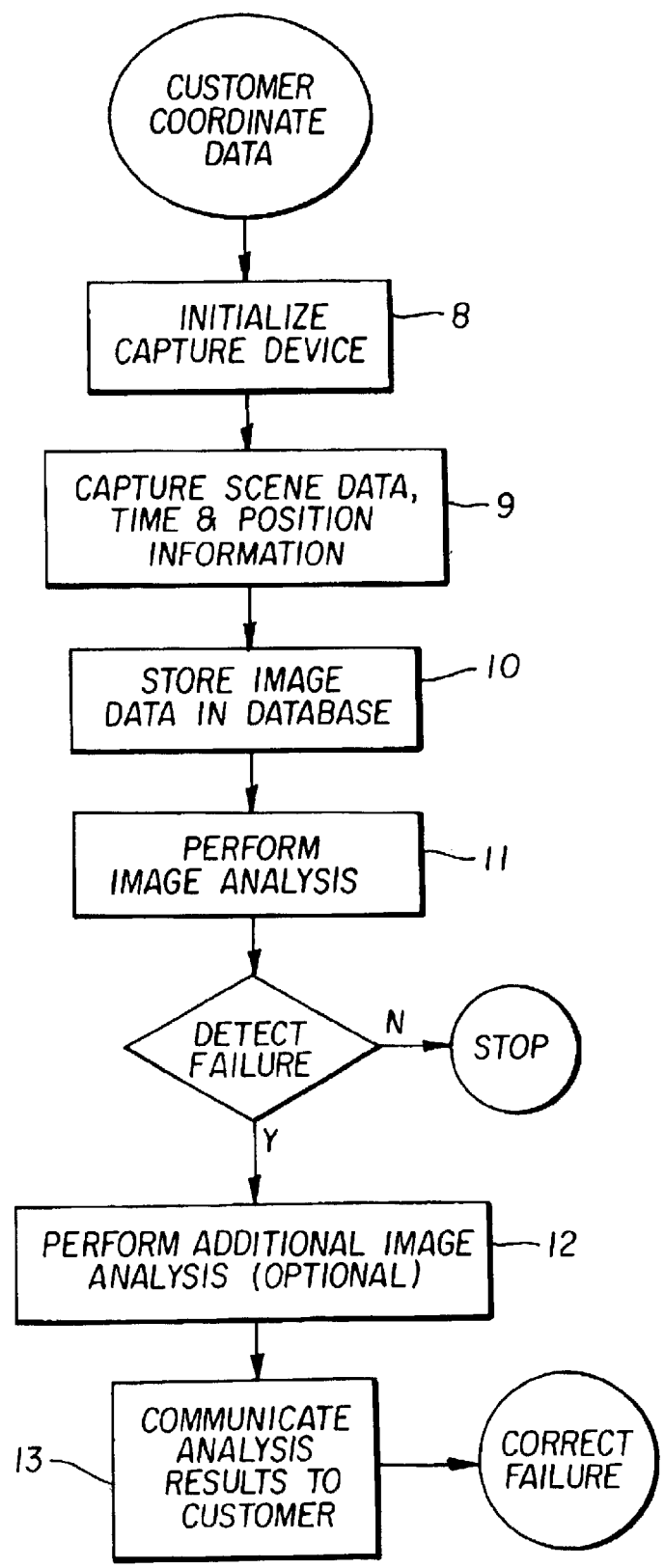
FIG. 2 is a flowchart in block diagram form of the process of capturing and processing images to detect potential material failures in man-made structures.

The overall process for detecting material failures in man-made structures is depicted in flowchart form in FIG. 2. The flowchart is in block diagram form and those skilled in the art will appreciate that many of the functions are controlled by the control computer 31. The starting event includes initializing the capture device 2 and image storage 6 to erase any previously captured scene data. Next a new scene is captured in block 9 using the position information supplied by the customer to trigger recording of the images. The image data along with position and time information necessary to identify the location and time of the current scene is stored in order to facilitate comparison with the same scene taken at other times. Image and other data are stored in a scene database 10 in order to perform such comparisons at a future time. Image analysis 11 is next performed in order to identify changes in the scene and facilitate identification of material failures in the man-made structures that appear in the scene. The latest scene image is compared with image data that has been previously stored in the scene database 10. If a material failure is not detected the process stops. Detection of a material failure may initiate further image analysis 12 as required by a customer 13. The identification process finishes with the results of the analysis communicated to the customer 13. The communication make take many forms, for example a telephone contact or e-mail notification of the detection of the material failure. The final step in the process is to correct the material failure.

Figure 3:
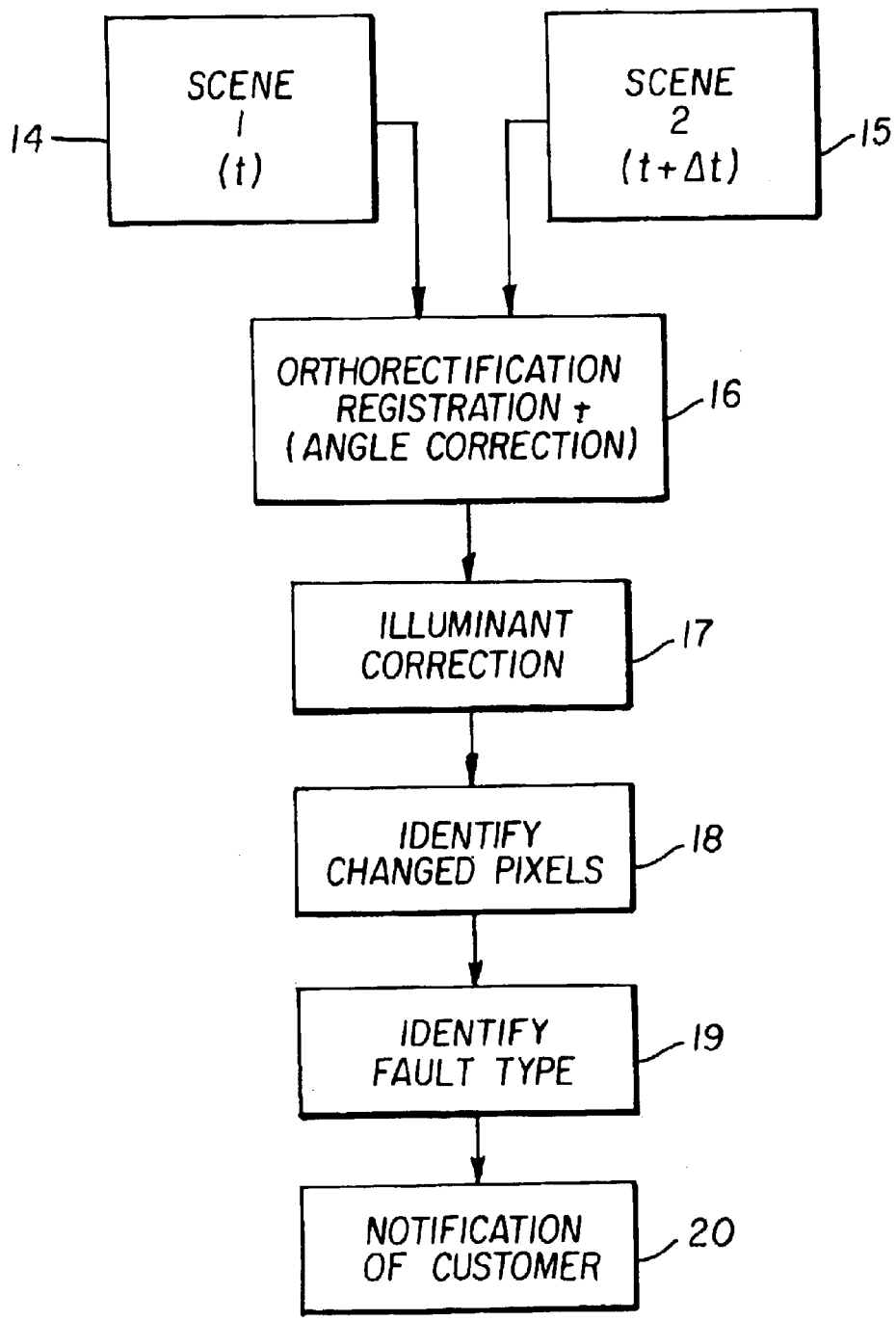
FIG. 3 is a flowchart in block diagram form of an image processing algorithm which can be used in the system shown in FIG. 1.

FIG. 3 depicts the algorithm used to process image data files from a database and identifies material failures if they have occurred. Two separate data files, scene (1) 14 and scene (2) 15, are made available for comparison. Both data files contain the same scene content, but they typically record images taken at different times. That is, the time between capturing the two images differs by a time Δt. Both image files or scenes undergo the process of orthorectification 16, that is, compensation for variations in position and angle at the time the scenes were recorded. This process is performed in order to allow an exact pixel by pixel comparison of the elements of a scene or image. It may or may not be necessary to correct the data in each scene for differences in the illumination 17 at the time each scene was recorded. Changes in the scene are identified in block 18 are used by the control computer 31 by detecting, using software, differences in the pixel content of the two scenes to be compared. Such changes may be reflected in the intensity of the pixels, or in the shape of an object, corresponding to a finite collection of pixels. Such methods for identification of pixel or object changes are well known to those skilled in the art. On the basis of such pixel changes the material failure type is identified in block 19 and the customer 13 is notified 20 of the existence of the failure.

Figure 4:
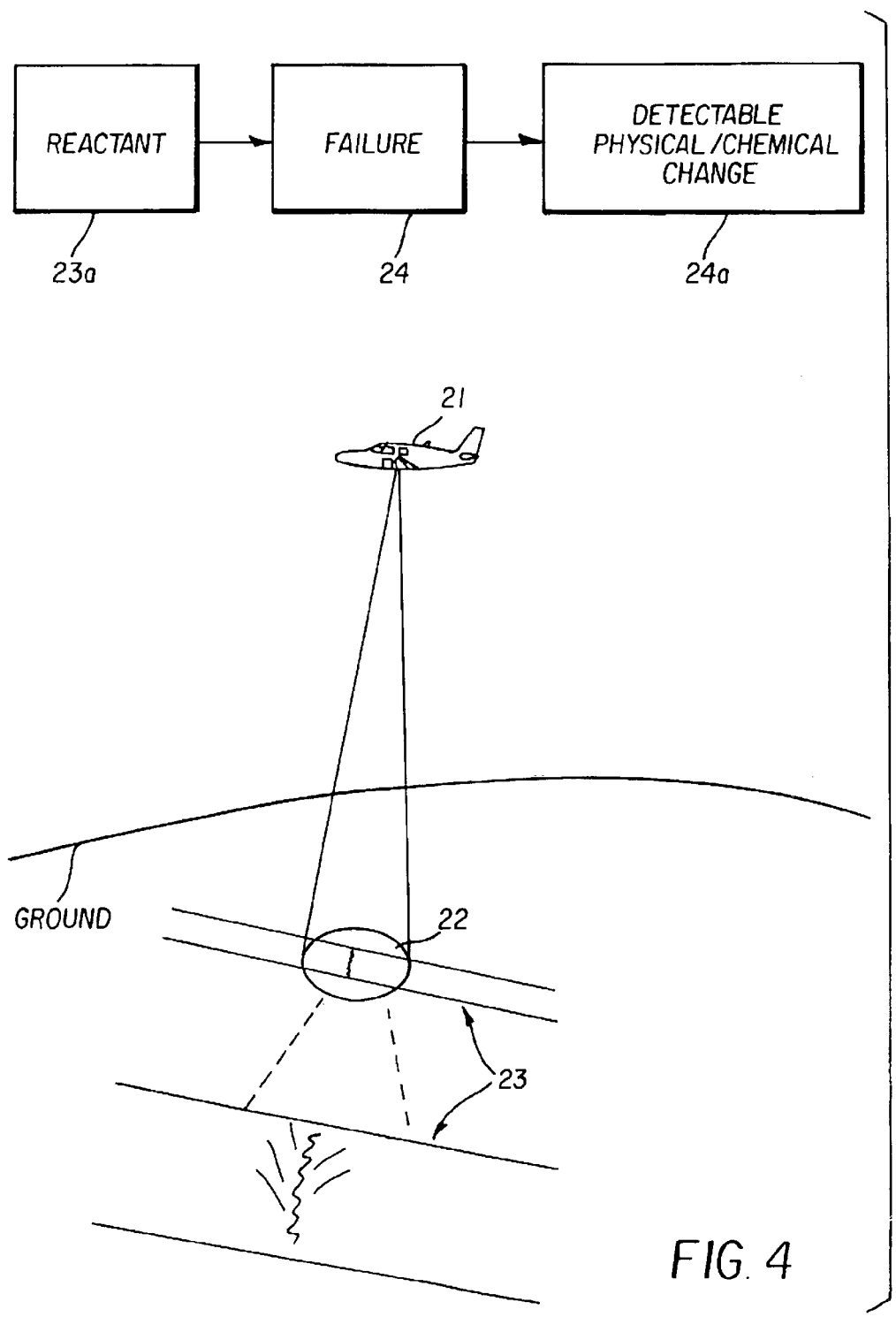
FIG. 4 illustrates a somewhat different embodiment of the present invention that uses a chemical agent to aid in detecting potential material failures in a man-made object.

FIG. 4 illustrates a somewhat different embodiment of the present invention that uses an agent to aid in detecting material failures in a man-made object. An aerial platform 21 performs image capture 22 of a man-made structure (in this case a roadway, 23) in the manner previously described. FIG. 4 also shows image capture of a roadway 23 with an isolated man-made failure 24. In this instance, the detection of the man-made material failure is enhanced by the presence of a chemical or physical image contrast-enhancing agent. The contrast agent for example, could be released to the environment as a consequence of the material failure occurring. For example, encapsulated fluorescent dyes, either as isolated molecular species or in crystalline form, embedded in a roadway could be released with crack formation. Triboluminescent materials that emit light upon mechanical impact could be sensed to determine the likelihood of material failure as a result of mechanical impact. Yellow-emitting halophosphate phosphors are well established as sensors when used in this mode of operation. In another use scenario, the contrast agent is incorporated into a man-made structure in a form where it becomes activated upon the occurrence of a material failure. For example, certain chemical species may undergo a color change upon exposure to air or other chemical species. An example is the use of corrosion-sensitive paints applied to pipelines. Color-changing chemical compounds (indicators) such as phenolphthalein or bromothymol blue, or fluorescing chemical compounds such as coumarins, can be incorporated into acrylic paints and applied to pipelines. Corrosion of the pipe causes a pH change in the paint; the consequence of which is a color change in the indicator or fluorescence. Such color changes are recorded remotely. Color-change materials exist that are sensitive to changes in pH, oxygen concentration, and the presence of trace quantities of various metal ions in the environment (chelating agents). The use of such materials is well known to those skilled in the art, and may be used singly or in combination, in remote sensing applications.

Such materials in combination with the optical filter 3 in FIG. 1 significantly improve the signal-to-noise ratio, and hence the detectability for remote sensing. The combination of the optical filter transmission function and the color-change to be detected as a result of a material failure will be optimized for each application. This optimization is well known to those skilled in the art.

Figure 5:
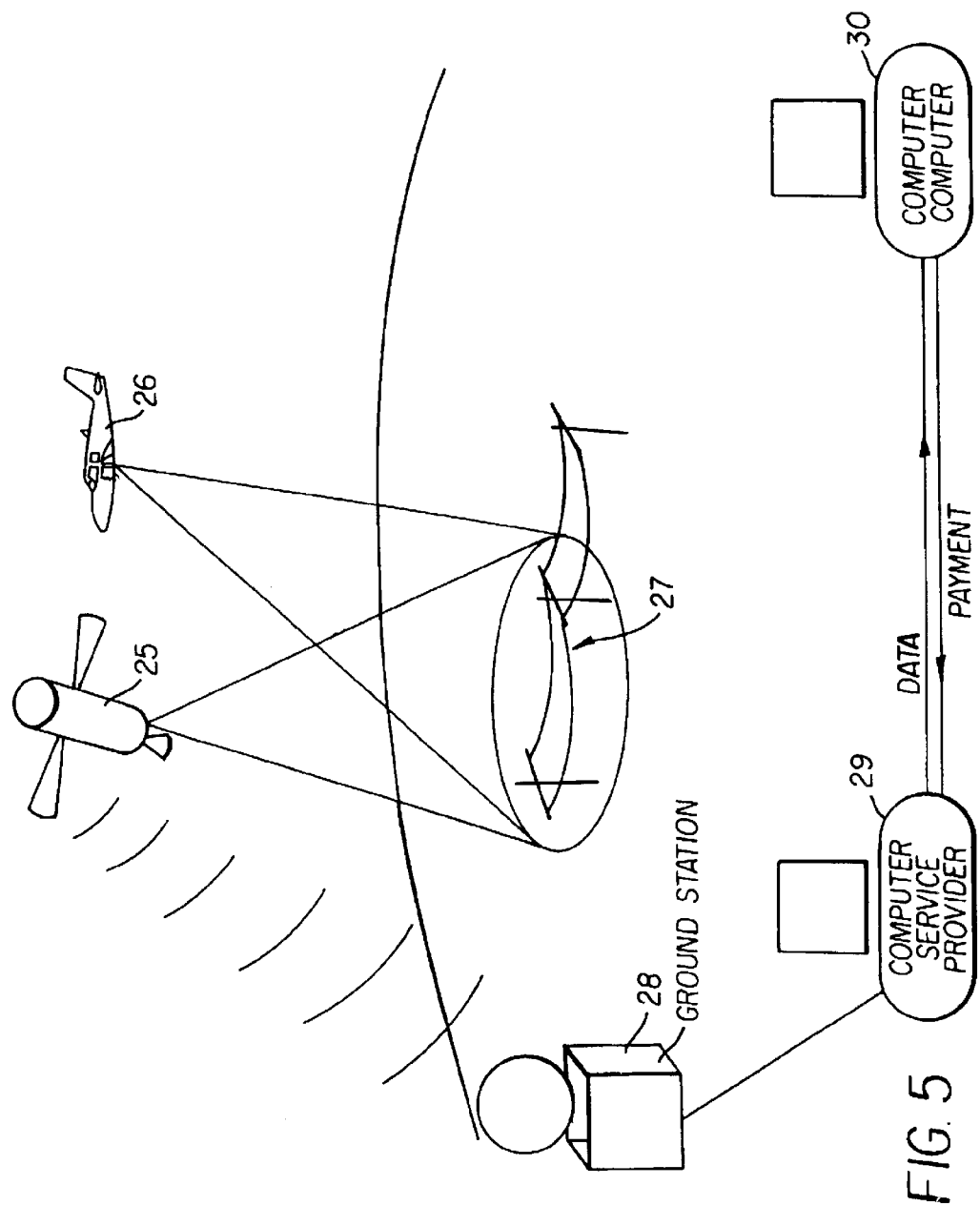
FIG. 5 illustrates the capturing of an image, analysis to identify a potential material failure, and communication over a channel to deliver information to and receive payment from a customer.

FIG. 5 illustrates the capturing of an image, analysis to identify a material failure and communication over a computer network to deliver information to and receive payment from the customer 13. A satellite 25 or an aerial platform 26 captures an image of a scene 27 that contains a man-made structure (in this case electrical utility lines) to be analyzed. The image data is transmitted to a ground station 28 and transferred to the service provider's computer system 29. The image data is analyzed as previously described to determine whether a material failure has occurred. If a failure is detected the customer 13 for the service receives notification of the failure via a channel for example, a computer network such as the Internet, or via other means, such as telephony. The customer computer 30 receives the notification directly from over the computer network. The customer 13 subscribes to the service and pays for the service via the computer network. In this manner, the timely delivery of information regarding the status of a failure can be transmitted to the customer and the quality of service can be assured to be at a sufficiently high level.

The invention has been described in detail with particular reference to certain preferred embodiments thereof, but it will be understood that variations and modifications can be effected within the spirit and scope of the invention. For example, the control computer 31 can itself be reprogrammed from a remote location and would include all the necessary communication links to permit such reprogramming.

PARTS LIST 1 sensor system
2 capture device
3 optical filter
4 capture control circuit
5 position and orientation control circuit
6 image storage
7 image processing circuit
9 block
10 scene database
11 image analysis
12 image analysis
13 customer
14 scene
15 scene
16 orthorectification
17 illumination
18 block
19 block
20 notification
21 aerial platform
22 capture
23 roadway
24 man-made failure
25 satellite
26 aerial platform
27 scene
28 ground station
29 service provider's computer system
30 customer computer
31 control computer

What is claimed is:

1. A method for capturing images of ground locations and for detecting the presence of material failure(s) or failures in man-made structures in such ground locations comprising the steps of:
   (a) providing an image sensor spaced remotely from the ground and which sequentially captures a number of images of various ground locations to provide digital images;
   (b) processing captured digital images to determine the presence of a potential material failure in an immobile or inert man-made structure by directly using predetermined coordinate positions which locate the man-made structures in one or more of the captured digital images; and
   (c) indicating to a customer that a potential material failure has been detected in a predetermined coordinate position.

2. The method of claim 1 further including:
   (d) sending captured processed digital images with detected potential material failures to a customer.

3. The method of claim 1 wherein the digital image processing includes comparing previously captured digital images with newly captured digital images to determine variations in the captured digital images at the predetermined coordinates which indicate a potential material failure in a man-made structure.

4. The method according to claim 1 wherein the digital images are captured by a capture device which is located in a fixed structure position above the ground location or in a moving structure such as an aircraft or satellite.

5. The method of claim 3 wherein the image processing includes storing in memory a representation of different material failures to be detected and comparing the captured digital image with the material failures to determine the presence of a material failure, type of material failures and location of the material failures.

6. A method for capturing images of ground locations and for detecting the presence of material failure(s) or failures in man-made structures having a detectable chemical agent in such ground locations comprising the steps of:
   (a) providing an image sensor spaced remotely from the ground and which sequentially captures a number of images of various ground locations to provide digital images;
   (b) processing captured digital images to determine changes in the chemical agent which indicate the presence of a potential material failure in an immobile or inert man-made structure by directly using predetermined coordinate positions which locate the man-made structures in one or more of the captured digital images; and
   (c) indicating to a customer that a potential material failure has been detected in a predetermined coordinate position.

7. The method of claim 6 wherein the chemical agent includes materials which when leaked from a receptacle are adapted to be detected.

8. The method of claim 6 wherein the chemical agent includes materials which when released react with substances in the ground to provide a detectable material failure to the image sensor.

9. A method for capturing images of ground locations and for detecting the presence of material failure(s) or failures in man-made structures in such ground locations comprising the steps of:
   (a) providing an image sensor spaced remotely from the ground and which sequentially captures a number of images of various ground locations to provide digital images;
   (b) processing captured digital images to determine the presence of a potential material failure in an immobile or inert man-made structure by directly using predetermined coordinate positions which locate the man-made structures in one or more of the captured digital images;
   (c) indicating to a customer that a potential material failure has been detected in a predetermined coordinate position; and
   (d) correcting material failures.

10. A method for capturing images of ground locations and for detecting the presence of failure(s) or material failures in man-made structures in such ground locations and making payment for the detection or correction of detected material failures comprising the steps of:
   (a) providing an image sensor spaced remotely from the ground and which sequentially captures a number of images of various ground locations to provide digital images;
   (b) processing captured digital images to determine the presence of a potential material failure in an immobile or inert man-made structure by directly using predetermined coordinate positions which locate the man-made structures in one or more of the captured digital images;

(c) indicating to a customer that a potential material failure has been detected in a predetermined coordinate position;
(d) correcting material failures; and
(e) enabling the customer to make payment to the service provider for the detection of the material failure.

11. The method of claim 10 further including providing a chemical agent that includes which materials which when released reacts with substances in the ground to provide a detectable material failure to the image sensor.

12. The method of claim 10 wherein the image processing includes comparing previously captured images with newly captured images to determine variations in a ground condition which could contain the material failure.

* * * * *